(12) United States Patent
Cornett et al.

(10) Patent No.: US 8,588,820 B2
(45) Date of Patent: *Nov. 19, 2013

(54) NOTIFYING A USER OF AN EVENT

(75) Inventors: Alan Cornett, Andover, MN (US);
Robert C. Becker, Golden Valley, MN (US); Jerome P. Drexler, Wyoming, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,669

(22) Filed: Sep. 14, 2012

(65) Prior Publication Data
US 2013/0012236 A1      Jan. 10, 2013

Related U.S. Application Data

(63) Continuation of application No. 12/880,895, filed on Sep. 13, 2010, now Pat. No. 8,285,305.

(51) Int. Cl.
*H04W 4/02* (2009.01)
(52) U.S. Cl.
USPC ............ 455/456.3; 455/456.1; 455/67.11; 455/67.16; 340/539.13; 340/572.1; 702/3
(58) Field of Classification Search
USPC ........... 455/404.2, 404.1, 435.1, 521, 414.3; 379/37, 88.16; 340/601, 691.5, 8.1, 340/691.1, 539.1, 531, 573.1, 540; 719/318; 702/3; 370/338, 353, 395.1
See application file for complete search history.

(56) References Cited

U.S. PATENT DOCUMENTS

| | | | |
|---|---|---|---|
| 6,091,956 A * | 7/2000 | Hollenberg | 455/456.5 |
| 6,243,039 B1 * | 6/2001 | Elliot | 342/457 |
| 6,405,132 B1 * | 6/2002 | Breed et al. | 701/301 |
| 6,581,008 B2 * | 6/2003 | Intriligator et al. | 702/3 |
| 6,726,099 B2 | 4/2004 | Becker et al. | |
| 6,741,188 B1 | 5/2004 | Miller et al. | |
| 6,885,334 B1 | 4/2005 | Hager et al. | |
| 7,044,387 B2 | 5/2006 | Becker et al. | |
| 7,156,312 B2 | 1/2007 | Becker et al. | |
| 7,298,251 B2 | 11/2007 | Meyers et al. | |
| 7,335,871 B2 | 2/2008 | Bauhahn et al. | |
| 7,401,740 B2 | 7/2008 | Becker et al. | |
| 7,463,187 B2 | 12/2008 | Becker et al. | |
| 7,477,707 B2 | 1/2009 | Kazi et al. | |
| 7,573,272 B2 | 8/2009 | Becker et al. | |
| 7,573,370 B2 | 8/2009 | Becker et al. | |
| 7,584,048 B2 | 9/2009 | Pham et al. | |

(Continued)

*Primary Examiner* — Mahendra Patel
(74) *Attorney, Agent, or Firm* — Brooks, Cameron & Huebsch, PLLC

(57) ABSTRACT

Devices, methods, and systems for notifying a user of an event are described herein. One or more embodiments include a computing device for notifying a user of an event. The computing device includes a memory and a processor coupled to the memory. The processor is configured to execute executable instructions stored in the memory to determine a location of a user based on location information received from a personal device of the user, receive information regarding a predicted path or range of an event, determine, based on the location of the user and the information regarding the predicted path or range of the event, if the user is located within the predicted path or range of the event, and send a notification of the event to the user if the user is located within the predicted path or range of the event.

18 Claims, 2 Drawing Sheets

(56) References Cited

U.S. PATENT DOCUMENTS

| | | |
|---|---|---|
| 7,634,393 B1 * | 12/2009 | Tunick et al. ............ 703/5 |
| 7,701,384 B2 | 4/2010 | Becker et al. |
| 7,730,776 B2 | 6/2010 | Cornett et al. |
| 7,777,668 B2 | 8/2010 | Becker et al. |
| 2002/0046248 A1 | 4/2002 | Drexler |
| 2003/0006912 A1 * | 1/2003 | Brescia ............ 340/990 |
| 2004/0046016 A1 | 3/2004 | Becker et al. |
| 2004/0046642 A1 | 3/2004 | Becker et al. |
| 2004/0046643 A1 | 3/2004 | Becker et al. |
| 2004/0048579 A1 | 3/2004 | Becker et al. |
| 2004/0070515 A1 * | 4/2004 | Burkley et al. ....... 340/825.49 |
| 2006/0071791 A1 | 4/2006 | Meyers et al. |
| 2006/0089759 A1 | 4/2006 | Becker |
| 2006/0164251 A1 | 7/2006 | Meyers et al. |
| 2007/0080788 A1 | 4/2007 | Manley et al. |
| 2007/0084987 A1 | 4/2007 | Bauhahn et al. |
| 2007/0098104 A1 | 5/2007 | Becker |
| 2007/0180338 A1 | 8/2007 | Becker et al. |
| 2007/0189425 A1 | 8/2007 | Becker |
| 2007/0296574 A1 * | 12/2007 | Smith et al. ............ 340/539.13 |
| 2008/0022575 A1 | 1/2008 | Drexler et al. |
| 2008/0074308 A1 | 3/2008 | Becker et al. |
| 2008/0082258 A1 | 4/2008 | Pham et al. |
| 2008/0172744 A1 | 7/2008 | Schmidt et al. |
| 2008/0186145 A1 | 8/2008 | Manley et al. |
| 2009/0095401 A1 | 4/2009 | Tucker et al. |
| 2009/0139091 A1 | 6/2009 | Tucker et al. |
| 2009/0146894 A1 | 6/2009 | Drexler et al. |
| 2009/0146895 A1 | 6/2009 | Drexler et al. |
| 2009/0155747 A1 | 6/2009 | Cornett et al. |
| 2009/0157293 A1 | 6/2009 | Cornett et al. |
| 2009/0219524 A1 | 9/2009 | Wang et al. |
| 2009/0251358 A1 | 10/2009 | Becker et al. |
| 2009/0251359 A1 | 10/2009 | Becker et al. |
| 2009/0308923 A1 | 12/2009 | Cornett et al. |
| 2009/0314078 A1 | 12/2009 | Cornett et al. |
| 2009/0319189 A1 | 12/2009 | Cornett et al. |
| 2010/0004913 A1 | 1/2010 | Becker et al. |
| 2010/0008337 A1 | 1/2010 | Bajko |
| 2010/0014066 A1 | 1/2010 | Becker et al. |
| 2010/0085241 A1 | 4/2010 | Meyers et al. |
| 2010/0102992 A1 | 4/2010 | Cornett et al. |
| 2010/0161257 A1 | 6/2010 | Cornett et al. |
| 2010/0172701 A1 | 7/2010 | Tucker et al. |
| 2010/0175573 A1 | 7/2010 | Cornett et al. |
| 2010/0204919 A1 | 8/2010 | Becker et al. |

* cited by examiner

201

222

DETERMINING IF A USER IS LOCATED WITHIN A PREDICTED PATH OR RANGE OF AN EVENT BASED ON THE PREDICTED PATH OR RANGE OF THE EVENT AND A LOCATION OF A PERSONAL DEVICE OF THE USER

224

SENDING, IF THE USER IS LOCATED WITHIN THE PREDICTED PATH OR RANGE OF THE EVENT, A NOTIFICATION OF THE EVENT AND ADVICE ON HOW TO DEAL WITH THE EVENT TO THE USER

NOTIFYING A USER OF AN EVENT

CROSS REFERENCE TO RELATED APPLICATION

This application is a continuation of U.S. application Ser. No. 12/880,895, filed Sep. 13, 2010, the entire specification of which is incorporated herein by reference.

TECHNICAL FIELD

The present disclosure relates to devices, methods, and systems for notifying a user of an event.

BACKGROUND

In the event of a crisis or emergency, such as, for example, severe weather or a natural disaster, individuals who are not aware of the crisis or emergency event may need to be notified of the event. Notification of the event can be provided by an emergency notification service, such as, for example, the National Weather Service (NWS). For instance, in the event of severe weather, the NWS may issue a watch or warning describing the type of severe weather (e.g., tornado, severe thunderstorm, etc.), and the counties that may be impacted by the severe weather.

However, a notification of an event provided by an emergency notification service may be misleading and/or incomplete. For example, the notification may cover a broader area than the area that may actually be impacted by the event. For instance, a severe weather watch or warning issued by the NWS may include, e.g., be issued for, an entire county, but only a portion of the county may actually be impacted by the severe weather. Accordingly, individuals who receive the notification may be unsure as to whether the notification actually applies to them, e.g., whether they may actually be impacted by the event.

Additionally, the notification may not include advice on how to deal with the event, e.g., safe locations to which an individual can go during or after the event. For instance, a severe weather watch or warning issued by the NWS may not include locations of, or directions to, severe weather shelters to which an individual can go during or after the severe weather. Accordingly, individuals who receive the notification may be unsure as to what to do and/or where to go during or after the event.

Further, the notification may not be timely, e.g., an individual may not receive the notification until after the event. For instance, an individual may not receive a severe weather watch or warning issued by the NWS until after the severe weather has passed. Accordingly, the individual may receive the notification too late for the notification to be useful for the individual.

Additionally, in some instances, an individual may be traveling and their location may be unfamiliar to them. Therefore, any location information may not be understood to be relevant to the individual, and/or the individual may not know where to seek shelter or find emergency services, among other needs.

DETAILED DESCRIPTION

Figure 1:
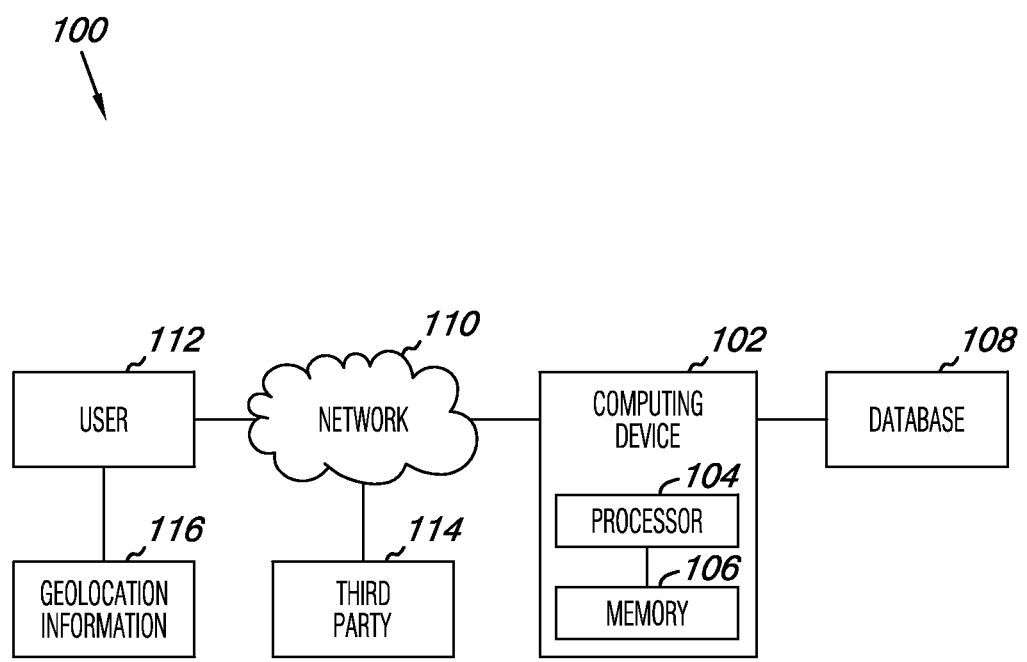
FIG. 1 illustrates a system for notifying a user of an event in accordance with one or more embodiments of the present disclosure.

Devices, methods, and systems for notifying a user of an event are described herein. One or more embodiments include a computing device for notifying a user of an event. The computing device includes a memory and a processor coupled to the memory. The processor is configured to execute executable instructions stored in the memory to determine a location of a user based on location information received from a personal device of the user, receive information regarding a predicted path or range of an event, determine, based on the location of the user and the information regarding the predicted path or range of the event, if the user is located within the predicted path or range of the event, and send a notification of the event to the user if the user is located within the predicted path or range of the event.

A notification of an event in accordance with one or more embodiments of the present disclosure can be a complete and/or accurate notification of the event. For example, the notification may be received only by individuals who are located in an area that may be impacted by the event. Accordingly, individuals who receive the notification may be sure that the notification actually applies to them.

Additionally, the notification may include advice on how to deal with the event, e.g., safe locations to which an individual can go during or after the event. Further, the notification may be timely, e.g., the individual may receive the notification before they are adversely affected by the event.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present invention, and should not be taken in a limiting sense.

As used herein, "a" or "a number of" something can refer to one or more such things. For example, "a number of locations" can refer to one or more locations.

FIG. 1 illustrates a system 100 for notifying a user of an event in accordance with one or more embodiments of the present disclosure. The event can be, for example, a crisis or emergency event, such as a severe weather event (e.g., tornado, severe thunderstorm, etc.) or natural disaster (earthquake, forest fire, etc.), among other types of events.

As shown in FIG. 1, system 100 includes a computing device 102. Computing device 102 can include a memory 104, and a processor 106 coupled to memory 104. Computing device 102 can be a computing device of a particular entity, such as a particular business, organization, or institution, for example.

Memory 104 can be volatile or nonvolatile memory. Memory 104 can also be removable, e.g., portable memory, or non-removable, e.g., internal memory. For example, memory 104 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 104 is illustrated as being located in computing device 102, embodiments of the present disclosure are not so limited. For example, memory 104 can also be located internal to another computing resource, e.g., enabling the computer readable instructions to be downloaded over the Internet or another wired or wireless connection.

As shown in FIG. 1, system 100 can include a database 108 coupled to, e.g., in communication with, computing device 102. Although one database is shown in FIG. 1, embodiments of the present disclosure are not so limited, e.g., system 100 can include more than one database coupled to computing device 102.

Database 108 can include, e.g., store, a number of locations to which an individual can go during or after a crisis or emergency event. For instance, database 108 can include information about the locations, such as, for example, the names of the locations, the addresses of the locations, the type of buildings and/or facilities at the locations, and/or descriptions of the locations, e.g., descriptions of the buildings and/or facilities at the locations. The locations can be, for example, shelters, such as severe weather shelters, hospitals, a particular room within a building, or any other type of safe location to which an individual can go during or after a crisis or emergency event.

As shown in FIG. 1, system 100 also includes a user 112, e.g., a personal device of user 112, coupled to, e.g., in communication with, computing device 102 via a network 110. As an example, the personal device of user 112 can be a cellular telephone, a mobile device (e.g., a mobile phone, a personal digital assistant, etc.), or a computer (e.g., a laptop or desktop computer), among other types of personal devices.

As shown in FIG. 1, the personal device of user 112 can have geolocation information 116 associated therewith. That is, the personal device of user 112 can include geolocation capability. Geolocation information 116 can be any information associated with the personal device of user 112 that can be used to identify the geographic location of user 112, e.g., the geographic location of the personal device of user 112. For example, geolocation information 116 can include Global Positioning System (GPS) information (e.g., GPS coordinates), Enhanced 911 (E911) information, information regarding the proximity of the personal device of user 112 to WIFI hotspots of known location, and triangulation information associated with the personal device of user 112, among other types of information.

The location of user 112 can be determined using geolocation information 116. For example, the location of user 112 can be determined using GPS information and/or E911 information from the personal device of user 112. Additionally, the location of user 112 can be determined using the proximity of the personal device of user 112 to WIFI hotspots of known location. Further, the location of user 112 can be determined by triangulating the personal device of user 112.

Network 110, can be, for example, a wide area network (WAN) such as the Internet, a local area network (LAN), a personal area network (PAN), a campus area network (CAN), or metropolitan area network (MAN), among other types of networks. As used herein, a "network", e.g., network 110, can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network, e.g., network 110, may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, system 100 also includes a third party 114, e.g., a computing device associated with third party 114, coupled to, e.g., in communication with, computing device 102 via network 110. The third party can be an entity, such as an emergency notification service, for example, having information about a crisis or emergency event. For instance, the third party can have information about the current and/or predicted path or range of the event, e.g., directional data associated with the event and/or locations that will or may be affected by the event. For example, the third party can be the National Weather Service (NWS), which can have information about the current and/or predicted path or range of a severe weather event.

In one or more embodiments of the present disclosure, computing device 102 can determine a location of user 112 (e.g., a location of the personal device of user 112) based on location information (e.g., geolocation information 116) received from the personal device of user 112. For example, if the personal device of user 112 is a cellular telephone, computing device 102 can determine the location of user 112 based on a triangulation of the cellular telephone. Further, computing device 102 can determine the location of user 112 based on GPS information and/or E911 information received from the personal device. Additionally, computing device 102 can determine the location of user 112 based on the proximity of the personal device to WIFI hotspots of known location.

Because the location of user 112 can be determined based on location information received from the personal device of user 112, the determined location of user 112 can be a specific and/or precise location. For example, the determined location can be a specific address, specific geolocation (e.g., GPS location, E911 location, or proximity to WIFI hotspots of known location), or even a specific location (e.g., room) within a building.

Computing device 102 can also receive information regarding the predicted path or range of an event, e.g., a crisis or emergency event, from third party 114. For example, computing device 102 can receive information regarding the predicted path of a severe weather event from the NWS, or range of affect of an event such as an earthquake, explosion, or other event that may affect an area but may not be on a path.

Computing device 102 can then determine, based on the location of user 112 and the information regarding the predicted path of the event or the event's range of affect, if user 112 is located within the predicted path or range of the event, e.g., if the user will be impacted by the event. For example, if the event is a severe weather event, computing device 102 can determine, based on the location of user 112 and the information regarding the predicted path or range of the severe weather event, if the user is located within the predicated path of the severe weather event or within the range of the event.

Computing device 102 can use a probability matrix to determine if user 112 is located within the predicted path or range of the event. For example, computing device 102 can determine a probability of whether user 112 is located within the predicted path or range of the event based on the predicted path or range of the event and the location of user 112.

Computing device 102 can then determine if the probability that user 112 is located within the predicted path or range of the event is greater than a predetermined probability. If the probability that user 112 is located within the predicted path or range of the event is greater than the predetermined probability, computing device 102 can determine that user 112 is located within the predicted path or range of the event.

If user 112 is located within the predicted path or range of the event, computing device 102 can send a notification of the event to user 112. For example, if user 112 is located within the predicted path or range of a severe weather event, computing device 102 can send a notification of the severe weather event to user 112.

Because the determined location of user 112 can be a specific and/or precise location, as previously described herein, user 112 may only receive a notification of the event if user 112 is located in an area that may be impacted by the event. Accordingly, user 112 can be sure that the notification does actually apply to user 112.

If user 112 is located within the predicted path or range of the event, computing device 102 can also send advice to user 112 on how to deal with the event. That is, the notification sent to user 112 can include advice on how to deal with the event. For example, if user 112 is located within the predicted path or range of a severe weather event, computing device 102 can send advice to user 112 on how to deal with the severe weather event.

The advice on how to deal with the event can include one or more locations for user 112 to go to during or after the event. For instance, the advice on how to deal with the event can include one or more of the locations stored in database 108 and/or information about one or more of the locations stored in database 108. For example, if the event is a severe weather event, the advice can include locations of one or more severe weather shelters stored in database 108.

Additionally, the one or more locations for user 112 to go to during or after the event can be located within a predetermined distance from the location of user 112. That is, locations stored in database 108 that are not within the predetermined distance from the location of user 112 may not be included with the advice on how to deal with the event. Accordingly, the advice on how to deal with the event may include locations for user 112 that can be quickly and/or easily gotten to by user 112.

Further, computing device 102 can determine if user 112 arrives at one of the one or more locations for user 112 to go to during or after the event. For example, computing device 102 can determine if user 112 arrives at one of the one or more locations based on location information, e.g., geolocation information, received from the personal device of user 112 during and/or after the event. Such a determination can be used by emergency personnel and/or employers to account for and/or locate employees that may be unaccounted for, among other benefits.

The advice on how to deal with the event can also include directions to the one or more locations for user 112 to go to during or after the event. For example, if the event is a severe weather event, the advice can include directions to one or more severe weather shelters or hospitals stored in database 108. The directions can be from the location of the user.

The advice on how to deal with the event can also include one or more locations for user 112 to avoid, e.g., one or more locations that would be dangerous, during or after the event. For example, if the event is a severe weather event, computing device 102 can advise user 112 to avoid tall objects (trees, poles, etc.), flood-prone areas, structures that are not sturdy or stable (mobile homes, gazebos, bleachers, etc.), and other locations that would be dangerous during or after a particular type of event, e.g., a location or instructions for a tornado may be different than those for a flood.

In some embodiments, computing devices, e.g., device 102, can automatically send the notification of the event and/or the advice on how to deal with the event to user 112 if user 112 is located within the predicted path or range of the event. Additionally and/or alternatively, computing device 102 can send the notification of the event and/or the advice on how to deal with the event to user 112 in response to a request from user 112. That is, computing device 102 can interact with user 112 before, during, and/or after the event.

Figure 2:
FIG. 2 illustrates a method for notifying a user of an event in accordance with one or more embodiments of the present disclosure.

FIG. 2 illustrates a method 201 for notifying a user of an event in accordance with one or more embodiments of the present disclosure. At block 222, method 201 includes determining if a user is located within a predicted path or range of an event based on the predicted path or range of the event and a location of a personal device of the user.

The user can be, for example, user 112 previously described in connection with FIG. 1. The event can be, for example, a crisis or emergency event, as previously described in connection with FIG. 1. The predicted path or range of the event can be received from a third party, e.g., third party 114 previously described in connection with FIG. 1, such as, for example, the National Weather Service (NWS), as previously described herein.

The personal device of the user can be, for example, a cellular telephone, and/or can include geolocation capability, such as Global Positioning System (GPS) and/or Enhanced 911 (E911) capability, as previously described in connection with FIG. 1. The location of the personal device of the user can be determined based on location information, e.g., geolocation information, received from the personal device of the user, as previously described in connection with FIG. 1. A probability matrix can be used to determine if the user is located within the predicted path or range of the event, as previously described in connection with FIG. 1.

At block 224, method 201 includes sending, if the user is located within the predicted path or range of the event, a notification of the event and advice on how to deal with the event to the user. The notification of the event and the advice on how to deal with the event may only be sent to the user if the user is located in an area that may be impacted by the event, as previously described herein. Additionally, The notification of the event and the advice on how to deal with the event can be automatically sent to the user, and/or sent to the user in response to a request from the user, as previously described in connection with FIG. 1.

The advice on how to deal with the event can include one or more locations for the user to go to during or after the event, e.g., one or more of the locations stored in database 108 previously described in connection with FIG. 1, as previously described herein. The one or more locations can be located within a predetermined distance from the location of the user, as previously described in connection with FIG. 1.

Although not shown in FIG. 2, method 201 can also include determining if the user arrives at one of the one or more locations for the user to go to during or after the event. Location information, e.g., geolocation information, received from the personal device of the user during and/or after the event can be used to determine if the user has arrived at one of the one or more locations, as previously described herein.

The advice on how to deal with the event can also include directions to the one or more locations for the user to go to during or after the event, e.g., from the location of the user, as previously described in connection with FIG. 1. The advice can also include one or more locations for the user to avoid, e.g., one or more locations that would be dangerous, during or after the event, as previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for notifying a user of an event, comprising:
   determining a location of a user based on location information received from a personal device of the user;
   receiving information regarding a predicted path or range of an event;
   determining when the user is located within the predicted path or range of the event by:
      determining a probability of whether the user is located within the predicted path or range of the event based on the predicted path or range of the event and the location of the user; and
      determining when the probability is greater than a predetermined probability, wherein the user is located within the predicted path or range of the event if the probability is greater than the predetermined probability; and
   sending a notification of the event and advice on how to deal with the event to the user when the user is located within the predicted path or range of the event.

2. The method of claim 1, wherein the advice on how to deal with the event includes one or more locations for the user to go to during or after the event.

3. The method of claim 1, wherein the advice on how to deal with the event includes one or more locations for the user to avoid during or after the event.

4. The method of claim 1, wherein the method includes automatically sending the notification of the event and the advice on how to deal with the event to the user when the user is located within the predicted path or range of the event.

5. The method of claim 1, wherein the method includes sending the notification of the event and the advice on how to deal with the event to the user in response to a request from the user.

6. The method of claim 1, wherein the method includes sending the notification of the event and the advice on how to deal with the event to the user only when the user is located within the predicted path or range of the event.

7. The method of claim 1, wherein the location of the user is a location within a building.

8. A computing device for notifying a user of an event, comprising:
   a memory; and
   a processor coupled to the memory, wherein the processor is configured to execute executable instructions stored in the memory to:
      determine when a user is located within a predicted path or range of an event by:
         determining a probability of whether the user is located within the predicted path or range of the event based on the predicted path or range of the event and a location of a personal device of the user; and
         determining when the probability is greater than a predetermined probability, wherein the user is located within the predicted path or range of the event when the probability is greater than the predetermined probability; and
      send, when the user is located within the predicted path or range of the event, a notification of the event to the user.

9. The computing device of claim 8, wherein the processor is configured to execute the executable instructions to determine the location of the personal device of the user based on a triangulation of the personal device.

10. The computing device of claim 8, wherein the processor is configured to execute the executable instructions to deterimine the location of the personal device of the user based on geolocation information received from the personal device.

11. The computing device of claim 10, wherein the geolocation information includes at least one of:
   Global Positioning System information associated with the personal device of the user;
   Enhanced 911 information associated with the personal device of the user; and
   information regarding a proximity of the personal device of the user to WIFI hotspots of known location.

12. The computing device of claim 8, wherein determining a probability of whether the user is located within the predicted path or range of the event includes using a probability matrix to determine the probability of whether the user is located within the predicted path or range of the event.

13. The computing device of claim 8, wherein the event is at least one of:
   a severe weather event; and
   a natural disaster.

14. The computing device of claim 8, wherein the processor is configured to execute the executable instructions to not send the notification of the event to the user when the user is not located within the predicted path or range of the event.

15. A computer implemented method for notifying a user of an event, comprising:
- deterimining a location of a user based on location information from a personal device of the user;
- receiving information regarding a predicted path or range of a severe weather event;
- determining, based on the location of the user and the information regarding the predicted path or range of the severe weather event, when the user is located within the predicted path or range of the severe weather event; and
- sending to the user, when the user is located within the predicted path or range of the severe weather event:
  - a notification of the severe weather event;
  - locations of one or more severe weather shelters for the user to go to during or after the severe weather event; and
  - directions to the one or more severe weather shelters, wherein the directions to the one or more severe weather shelters are from the location of the user.

16. The method of claim 15, wherein the method includes sending to the user, when the user is located within the predicted path or range of the severe weather event, one or more locations for the user to avoid during or after the severe weather event.

17. The method of claim 15, wherein the method includes receiving the locations of the one or more severe weather shelters from a database having locations of a number of severe weather shelters.

18. The method of claim 15, wherein the method includes receiving the information regarding the predicted path or range of the severe weather event from the National Weather Service.

* * * * *